United States Patent [19]

Pahlsson

[11] Patent Number: 5,031,751
[45] Date of Patent: Jul. 16, 1991

[54] CONVEYOR
[75] Inventor: Sten Pahlsson, ÖdÅkra, Sweden
[73] Assignee: Frigoscandia Contracting AB, Helsingborg, Sweden
[21] Appl. No.: 488,022
[22] PCT Filed: Jul. 24, 1989
[86] PCT No.: PCT/SE89/00418
  § 371 Date: May 16, 1990
  § 102(e) Date: May 16, 1990
[87] PCT Pub. No.: WO90/01011
  PCT Pub. Date: Feb. 2, 1990
[30] Foreign Application Priority Data
  Jul. 26, 1988 [SE] Sweden ................ 8802726
[51] Int. Cl.⁵ ............................. B65G 37/00
[52] U.S. Cl. ..................... 198/570; 198/778; 62/381
[58] Field of Search ............ 198/570, 778; 62/381
[56] References Cited

U.S. PATENT DOCUMENTS 3,666,083  5/1972  Smith ........................ 198/778
3,682,295  8/1972  Roinestad ................... 198/778
3,794,156  2/1974  Brackmann et al. .
3,938,651  2/1976  Alfred et al. .
4,036,352  7/1977  White .
4,450,953  5/1984  Le Cann et al. .
4,565,282  1/1986  Olsson et al. .
4,875,343  10/1989  Jeppsson .................... 198/778
4,899,871  2/1990  Olsson ....................... 198/778

FOREIGN PATENT DOCUMENTS 0110856  6/1984  European Pat. Off. .
85061364  12/1985  Sweden .

Primary Examiner—Joseph E. Valenza
Attorney, Agent, or Firm—Browdy and Neimark

[57] ABSTRACT

A conveyor comprises an endless conveyor belt (1) which along part of its length follows a path consisting of a number of helically extending turns laid upon each other, and a supporting installation (8, 9, 19) consisting of two endless chains (8, 9) which are carried by supports (19) and support the lowermost of the helically extending belt turns by supporting the belt edge portions along this turn. A second endless conveyor belt (1') is of substantially the same shape as the first-mentioned conveyor belt (1) and follows along part of its length a path consisting of a number of helically extending turns laid upon each other and alternating with the turns of the first-mentioned conveyor belt. With the exception of the lowermost turn of the first-mentioned conveyor belt (1), each turn of one (1,1') of the conveyor belts is supported by an underlying turn of the other conveyor belt (1'; 1), and vice versa, via spacing members (6, 6') arranged adjacent the belt edges, such that a self-supporting belt pile (2) is formed of the helically extending turns of said two conveyor belts.

7 Claims, 5 Drawing Sheets

CONVEYOR

The present invention relates to a conveyor comprising an endless conveyor belt which along part of its length follows a path consisting of a number of helically extending turns laid upon each other, and a supporting installation consisting of two endless chains which are carried by supports and support the lowermost of the helically extending belt turns by supporting the belt edge portions along said turn.

Conveyors of this type are disclosed in for example SE-C-7303179-1 and SE-C-8206760-4. The actual conveyor belt consists of link means which are mutually articulated and displaceable relative to each other. Each link means consists of a bottom part and spacing members fitted at the side edges of the bottom part and constituting the two sides of the belt.

The supporting installation used in the conveyor can be of the type disclosed in SE-C-8206759-6. This supporting installation can support a belt pile throughout a continuous revolution, since it is positioned substantially outside and, respectively, inside the circumferential surfaces of the belt pile and since each of its chains and the associated support rail are not higher than the height of the belt, i.e. the height of the spacing members.

The described conveyor is conveniently used in a freezing plant, the belt pile being accommodated in a substantially closed container or the like which also holds a refrigerating machine adapted to blow cooling air axially through the belt pile.

The freezing capacity of such a freezing plant is, of course, dependent on the cooling capacity of the refrigerating machine, but the product of the maximum speed of the belt and its load capacity per unit of length sets an upper limit to the freezing capacity. This means that the freezing plant is poorly used when freezing easily frozen products, since the entire cooling capacity of the refrigerating machine then cannot be used efficiently. If the belt thus travels at its maximum speed and the entire cooling capacity of the refrigerating machine is used, the products will be frozen long before they have passed through the freezing plant. A conveyor belt of smaller length inside the container, for example fewer turns in the belt pile, would then be sufficient, but such a lower belt pile restricts the capacity when freezing products which are difficult to freeze.

A first object of the present invention is to provide a conveyor of the type mentioned by way of introduction which renders it possible to fully utilise the capacity of the refrigerating machine in a freezing plant, independently of whether the products which are to be frozen, are easy or difficult to freeze.

A second object of the invention is to achieve such an improvement without necessitating an increased space for the freezing plant.

According to the present invention, these objects are achieved through the arrangement of a second endless conveyor belt which is of substantially the same shape as the first-mentioned conveyor belt and along part of its length follows a path consisting of a number of helically extending turns laid upon each other and alternating with the turns of the first-mentioned conveyor belt, each turn of one of the conveyor belts, except the lowermost turn of the first-mentioned conveyor belt, being supported by an underlying turn of the other conveyor belt, and vice versa, via spacing members arranged adjacent the belt edges, such that a self-supporting belt pile is formed of the helically extending turns of the two conveyor belts.

By arranging double conveyor belts in a self-supporting belt pile, which involves considerable difficulties, one obtains the advantage of a doubled freezing capacity for easily frozen products and a maintained freezing capacity for products that are difficult to freeze.

To make the belt pile with double conveyor belts possible, the endless chains have, in their run along the lowermost of the helically extending turns of the first-mentioned conveyor belt, a rise corresponding to the total height of the two conveyor belts, and moreover at least the inner chain supports the first-mentioned conveyor belt in the run of said chain up to the beginning of the lowermost turn, with a second, bigger rise than along the same turn.

According to the invention, there is further arranged a fixed supporting installation for carrying the second conveyor belt in the run thereof over the beginning of the lowermost turn of the first-mentioned conveyor belt, said fixed supporting installation giving the second conveyor belt a third rise which is smaller than the second rise. As a result, the second conveyor belt is supported by the first-mentioned conveyor belt not later than at the beginning of the lowermost turn thereof and from now on moves together with the first-mentioned conveyor belt as a unit.

The fixed supporting installation preferably is self-supporting at its end adjacent the beginning of the lowermost turn of the first-mentioned conveyor belt and can conveniently comprise two parallel bars arranged at a distance from one another which is smaller than the distance between the spacing members of the second conveyor belt.

The fact that the second conveyor belt is of substantially the same shape as the first-mentioned conveyor belt means that the two conveyor belts are identical, possibly with the exception of the height of the spacing members.

Finally, the runs of the two conveyor belts up to the belt pile can preferably form an angle with each other in the horizontal plane. This facilitates the loading of products on to the two conveyor belts.

In the same manner, the runs of the two conveyor belts out of the belt pile suitably form an angle with each other in the horizontal plane, whereby a simple, separate unloading of products from the two conveyor belts is made possible.

The invention will now be described in detail with reference to the accompanying drawings in which.

Figure 1:
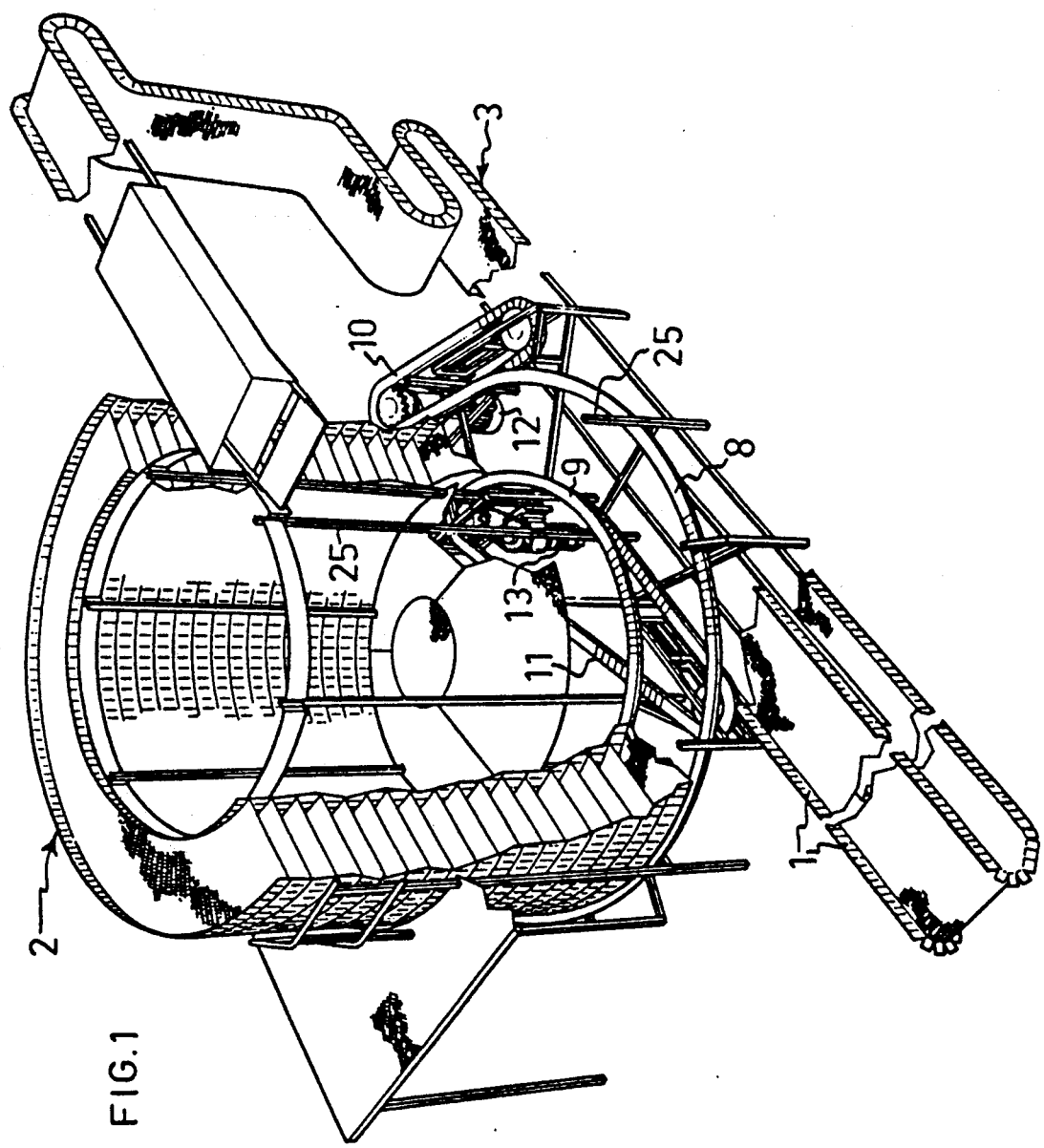
FIG. 1 is a perspective view of a known conveyor having a single conveyor belt according to prior art technique.

The prior art conveyor shown in FIG. 1 comprises a conveyor belt 1 which is adapted to follow, along part of its length, a path consisting of a number of helically extending turns laid above each other in a pile 2. The conveyor belt 1 is endless and extends from the upper end of the pile in a path 3 outside the pile 2 to the lower end thereof. However, the turning direction of the pile 2 is optional, and the belt can thus leave the pile 2 either at the upper end or at the lower end.

Figure 3:
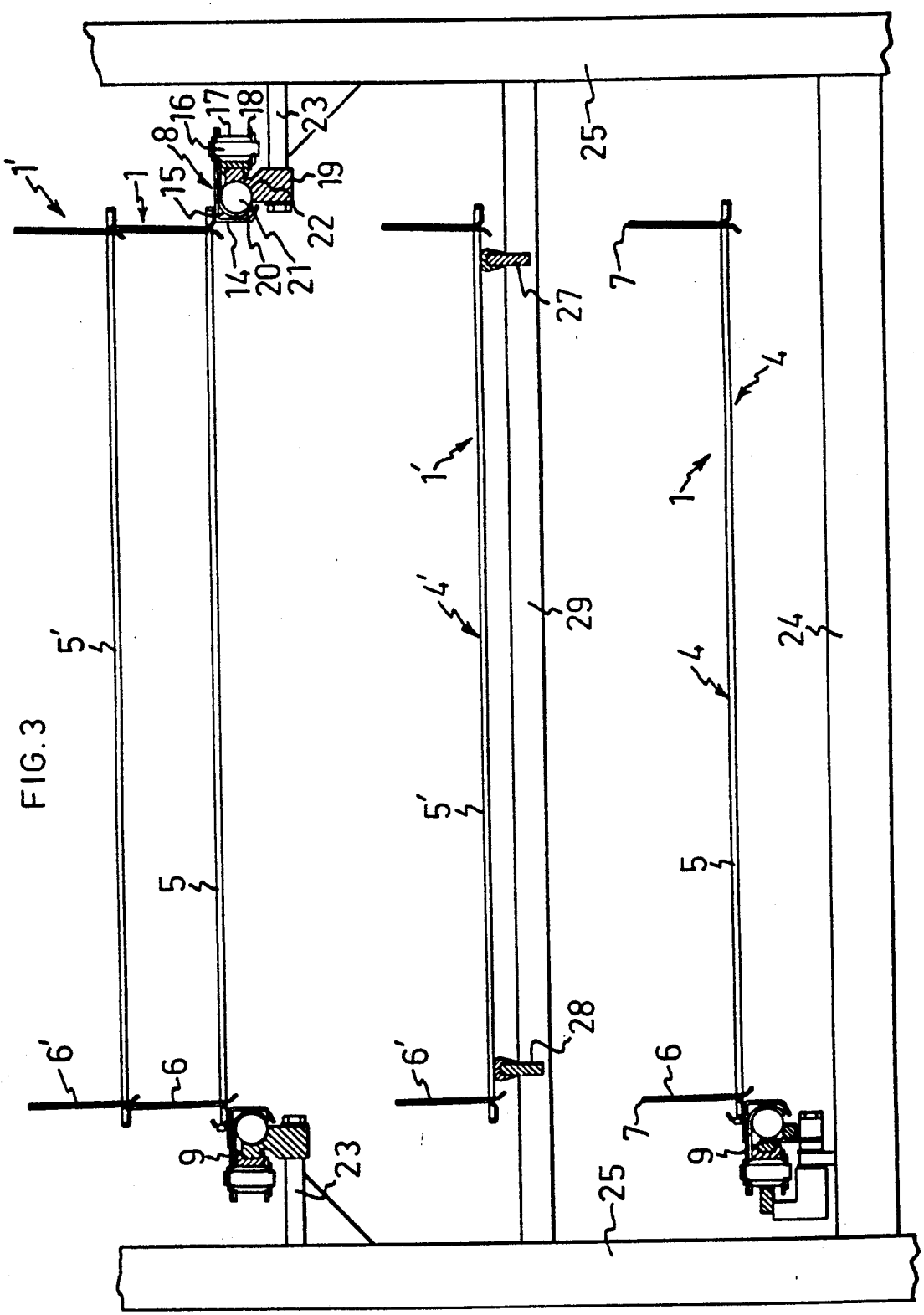
FIG. 3 is a cross-sectional view along line III—III in FIG. 2.

To be able to move helically, as shown in FIG. 1, the belt 1 comprises, in per se known manner, a plurality of link means 4 (FIG. 3). The link means extend in the lateral direction of the belt 1 and are horizontally displaceable relative to each other in the longitudinal direction of the belt, such that the belt is turnable in the lateral direction. They are also vertically pivotable relative to each other about an axis parallel to the lateral direction. Thus the belt can follow an endless path as shown in FIG. 1, i.e. with straight portions and with curved portions through vertical and horizontal curves. The actual piling is possible in that each link means 4 consists of staff-like members 5 (FIG. 3) which are included in the bottom part of the belt 1 and at the ends of which upright links 6 are fitted. The links 6 which form the sides of the belt 1, constitute spacing members which are adapted to bear with their upper edge portions 7 against the lower edge portions of the spacing members of the overlying turn and thus carry the overlying belt turn (FIG. 1).

The pile 2 of the superposed, helically extending turns of the endless conveyor belt 1 is carried by a supporting installation. This comprises, as shown in FIG. 1, two endless chains 8 and 9 which are arranged under the lowermost turn of the belt pile 2, support the two side edge portions of the belt 1 and are themselves carried by supports. Each of the chains 8 and 9 is adapted to follow the belt 1 in the rise through at least one complete revolution. Then the chains 8 and 9 travel in a direction opposite the rise of the conveyor belt 1 in a return run 10 and 11, respectively, beside the belt pile 2 so as to form an endless chain. The chain 8 follows the return run 10 which is narrower than the pile 2 and positioned outside the belt pile 2, while the chain 9 follows the return run 11 which is positioned inside the belt pile 2 and which is also narrower than the belt pile 2.

At the beginning of the return run 10, the chain 8 is driven by a motor 12 and in turn drives the supported conveyor belt 1. Also the chain 9 can be driven by a second motor 13.

As shown in FIG. 3, each chain 8, 9 consists of links 14 and 15 overlapping each other. The links 14 are outer links and overlap the links 15 which are inner links. The links 14, 15 are interconnected by spindles 16 on which further a link roller 17 is rotatably mounted between the links 14, 15 and a lower chain bar 18 of substantially the same length as the inner link 15. Each inner link 15 extends along a support rail 19 and has a downwardly deflected edge portion 20 with a bending radius which substantially conforms to the radius of balls 21 which serve as rolling elements between the rail 19 and the chain 8 and 9, respectively. The rail 19 has a roll race 22 which extends opposite the downwardly deflected side edge portion 20 of the inner link 15 and on which the balls 21 roll, while transferring the load of the belt pile 2 to the support 19. The rail 19 is supported by brackets 23 or cross bars 24 which are fixedly mounted in uprights 25. The supporting installation is described in detail in SE-A-8603202-6.

Figure 2:
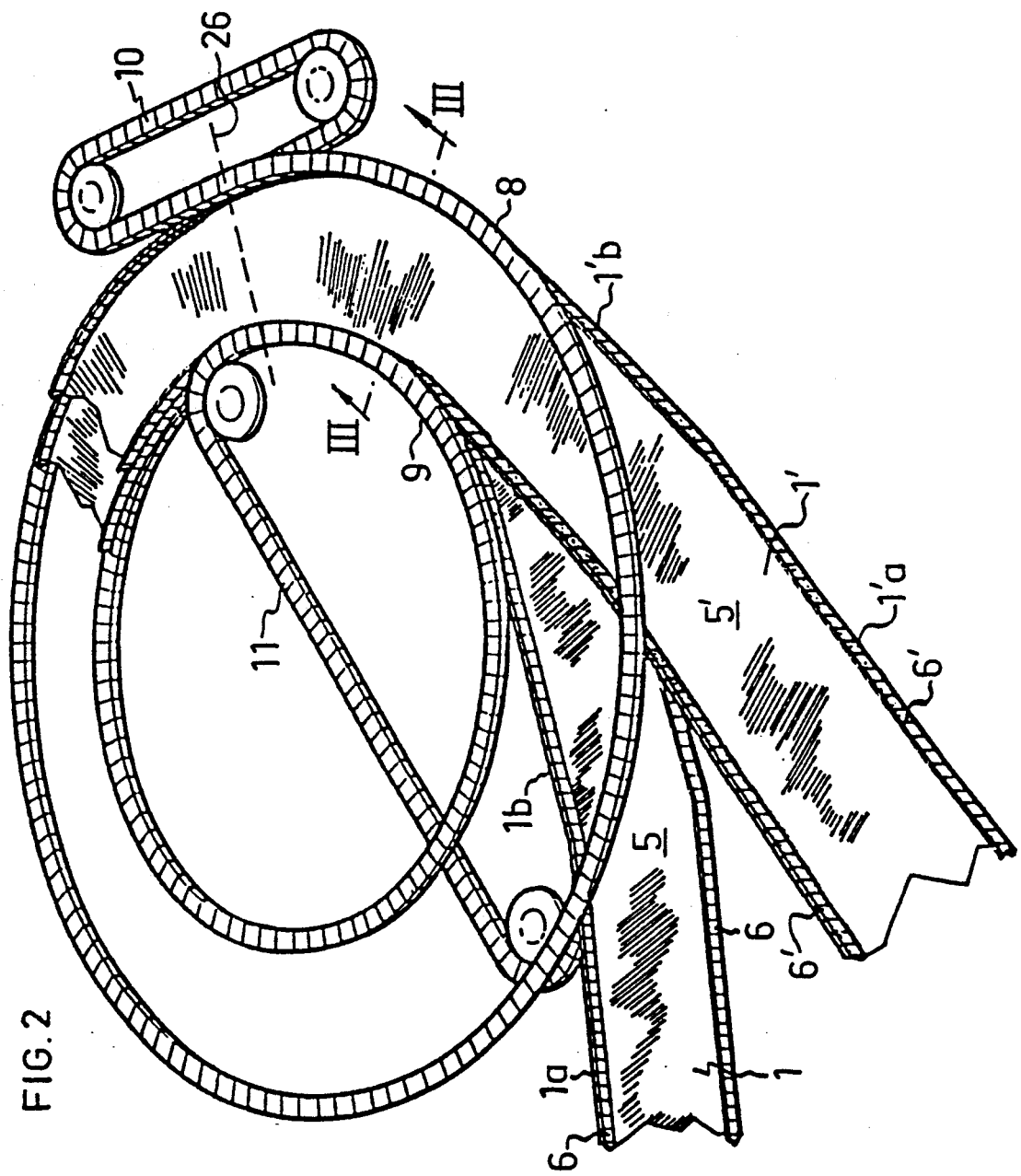
FIG. 2 is a schematic perspective view of the supporting installation and the feeding of two conveyor belts to the lowermost turn in a belt pile according to the invention.

According to the present invention, the belt pile 2 is formed of the conveyor belt 1 and of a second conveyor belt 1', as shown in detail in FIGS. 2 and 3. The conveyor belt 1 has in its run towards the lowermost turn in the belt pile 2 a first portion 1a which follows a substantially horizontal path, and a second portion 1b which follows a path having a rise which is bigger than the rise of the chains 8, 9 along the lowermost turn of the belt 1 in the belt pile 2. The latter rise corresponds to the total height of the two conveyor belts 1, 1'. The portion 1b of the conveyor belt 1 is at its inner edge carried by the chain 9, while the outer edge of the portion 1b is carried by a fixed support which is not shown.

In its run towards the belt pile, the second conveyor belt 1' has an outer portion 1'a which follows a substantially horizontal path, and an inner portion 1'b having a rise which is smaller than the rise of the portion 1b of the conveyor belt 1. As a result, the conveyor belt 1' rests against the conveyor belt 1 so as to be supported by the links 6 thereof, as shown in the upper part of FIG. 3.

The second conveyor belt 1' rests against the conveyor belt 1 at a point before a radius 26 in the lowermost belt turn. From the radius 26, the conveyor belt is carried by the chains 8 and 9 through at least one turn. For carrying the second conveyor belt 1' up to the point where it is carried by the conveyor belt 1, there is arranged a fixed supporting installation which thus supports the second conveyor belt 1' along the portions 1'a and 1'b. This supporting installation consists more precisely of two parallel bars 27, 28 whose top face has a coating of a material with a low friction coefficient and which are supported by cross bars 29 fixedly mounted in the uprights 25. The bars 27, 28 are, however, self-supporting at their ends adjacent the beginning of the lowermost turn of the conveyor belt 1, i.e. the position in which the second conveyor belt 1' comes into engagement with the conveyor belt 1.

As shown in FIG. 2, the conveyor belt 1 and the conveyor belt 1' are supplied at different angles towards the belt pile 2. As a result, the loading stations of the conveyor belts 1, 1', which are positioned in the extension of the portions 1a, 1'a, are separated, which of course facilitates the loading of products.

Figure 4:
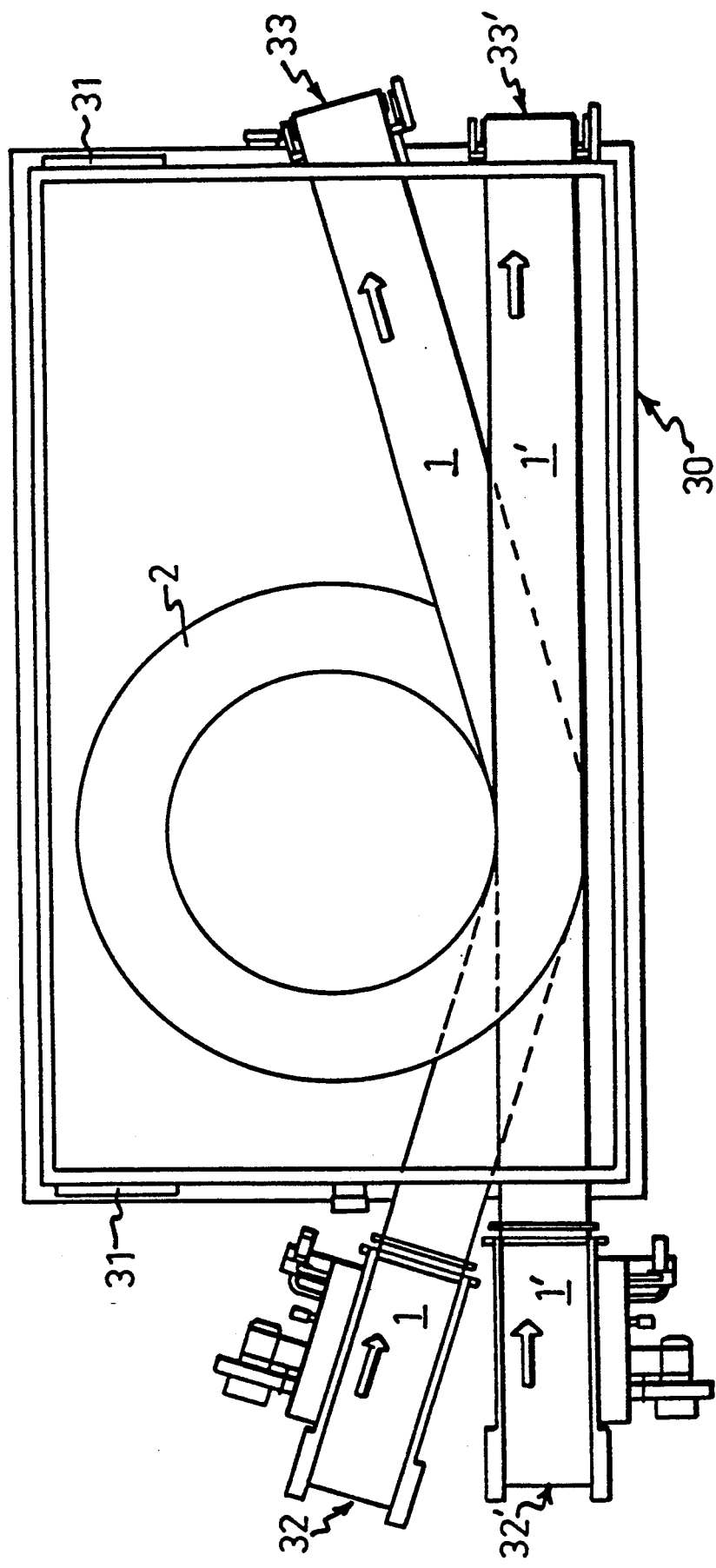
FIG. 4 is a schematic top plan view of a conveyor according to the invention in a freezing plant.
Figure 5:
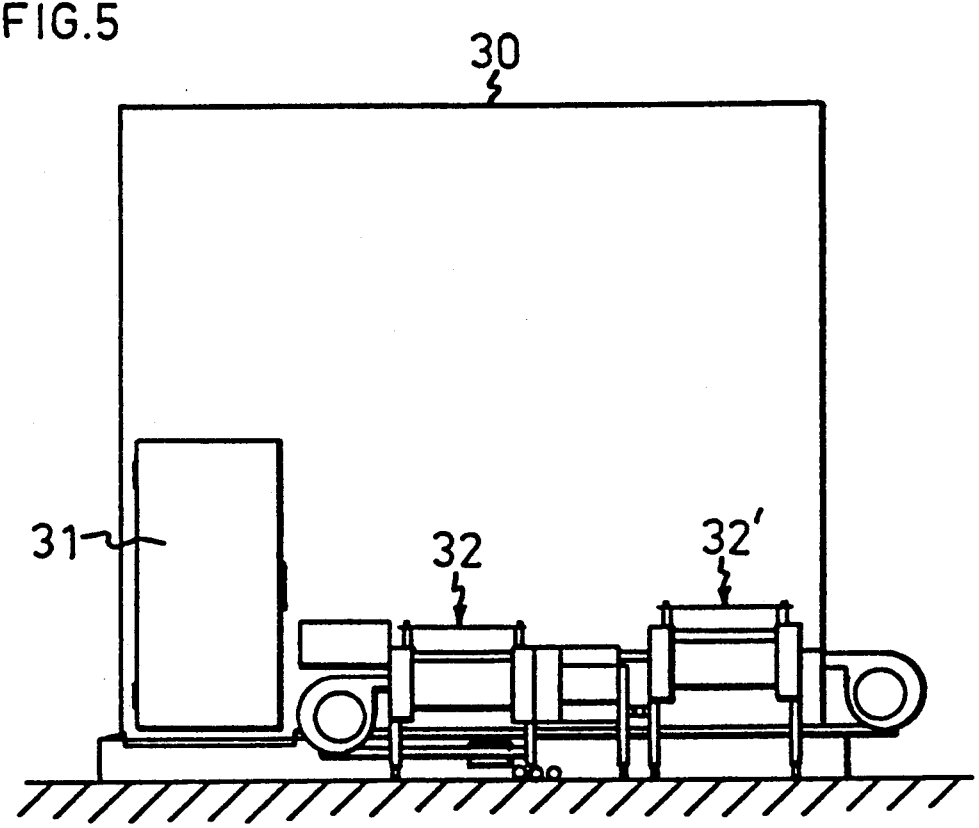
FIG. 5 is a front view of the feeding side of the freezing plant in FIG. 4.
Figure 6:
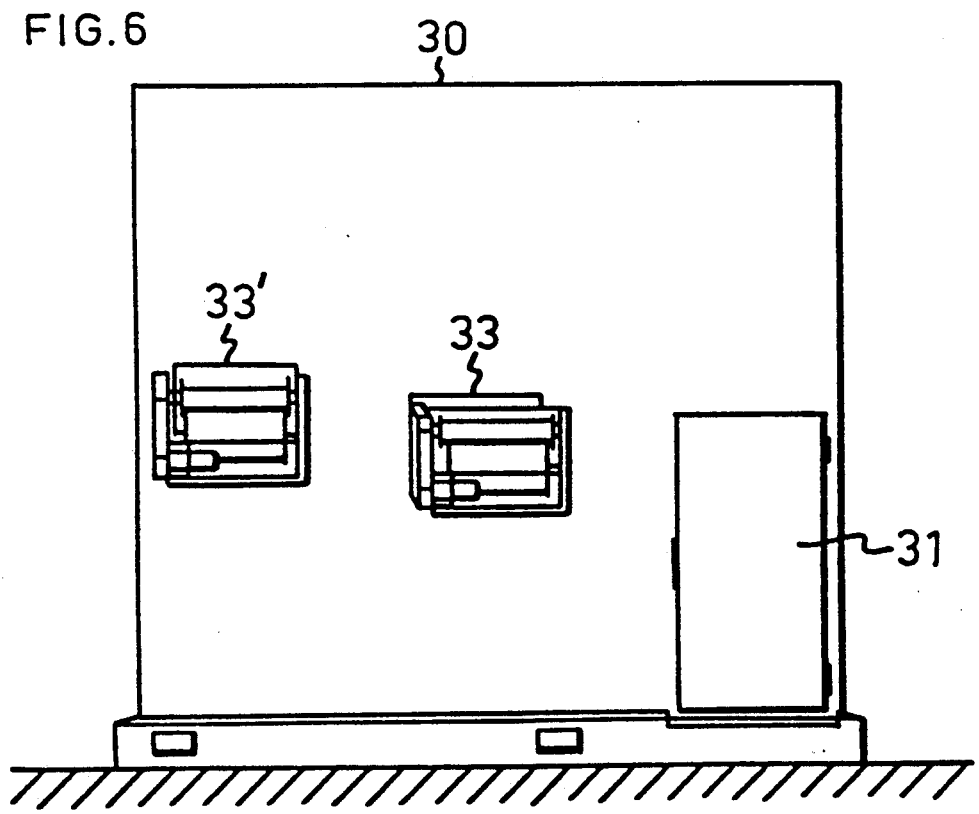
FIG. 6 is a rear view of the discharge side of the freezing plant in FIG. 4.

The use of the inventive conveyor in a freezing plant is shown schematically in FIGS. 4-6. As appears from FIG. 4, the belt pile 2 is accommodated in a container 30 whose short sides is provided with doors 31 for entering the interior of the container 30, and openings for introducing the belts 1, 1' from loading stations 32, 32' into the container 30 and for discharging the belts 1, 1' to emptying stations 33, 33'. The container 30 holds a refrigerating machine (not shown) which is adapted to blow cooling air axially through the belt pile 2. As shown in FIG. 4, the runs of the two conveyor belts 1, 1' up to the belt pile 2 form an angle with each other in the horizontal plane. This also applies to the runs of the conveyor belts 1. 1' out of the belt pile 2 to the emptying stations 33, 33'.

In the embodiment shown in FIGS. 4-6, the loading stations 32, 32' are positioned on different levels, and this also applies to the emptying stations 33, 33'.

A variety of modifications of the conveyor described above are possible within the scope of the invention as defined in the appended claims.

What is claimed is:

1. A conveyor comprising an endless conveyor belt (1) which along part of its length follows a path consisting of a number of helically extending turns laid upon each other, and a supporting installation (8, 9, 19) consisting of two endless chains (8, 9) which are carried by supports (19) and support the lowermost of the helically extending belt turns by supporting the belt edge portions along said turn, characterised by a second endless conveyor belt (1') which is of substantially the same shape as the first-mentioned conveyor belt (1) and along part of its length follows a path consisting of a number of helically extending turns laid upon each other and alternating with the turns of the first-mentioned conveyor belt, each turn of one (1; 1') of the conveyor belts, except the lowermost turn of the first-mentioned conveyor belt (1), being supported by an underlying turn of the other conveyor belt (1'; 1), and vice versa, via spacing members (6, 6') arranged adjacent the belt edges, such that a self-supporting belt pile (2) is formed of the helically extending turns of said two conveyor belts.

2. The conveyor as claimed in claim 1, characterised in that said endless chains (8, 9) have, in their run along the lowermost of the helically extending turns of said first-mentioned conveyor belt (1), a rise corresponding to the total height of the two conveyor belts (1, 1'), and that at least the inner chain (9) supports the first-mentioned conveyor belt (1) in the run (1b) of said chain up to the beginning of the lowermost turn, with a second, bigger rise than along the same turn.

3. The conveyor as claimed in claim 2, characterised by a fixed supporting installation (27, 29) for carrying the second conveyor belt (1') in the run thereof (1'b) over the beginning of the lowermost turn of the first-mentioned conveyor belt (1), said fixed supporting installation giving the second belt a third rise which is smaller than the second rise.

4. The conveyor as claimed in claim 3, characterised in that said fixed supporting installation (27–29) is self-supporting at its end adjacent the beginning of the lowermost turn of the first-mentioned conveyor belt (1).

5. The conveyor as claimed in claim 4, characterised in that said fixed supporting installation (27–29) comprises two parallel bars (27, 28) which are arranged at a distance from one another which is smaller than the distance between the spacing members (6') of the second conveyor belt (1').

6. The conveyor as claimed in claims 1, characterised in that the runs of the two conveyor belts (1, 1') up to the belt pile (2) form an angle with each other in the horizontal plane.

7. The conveyor as claimed in claims 1, characterised in that the runs of the two conveyor belts (1, 1') out of the belt pile (2) form an angle with each other in the horizontal plane.

* * * * *